United States Patent [19]

Shiraki et al.

[11] Patent Number: 4,938,908

[45] Date of Patent: Jul. 3, 1990

[54] FLEXIBLE TUBE OF THERMOPLASTIC RESIN HAVING POOR MELT FLOWABILITY AND PRODUCTION METHOD AND APPARATUS THEREOF

[75] Inventors: Takeshi Shiraki, Kuga; Yosihiro Yoshimura, Iwakuni, both of Japan

[73] Assignee: Mitsui Petrochemical Industries, Ltd., Tokyo, Japan

[21] Appl. No.: 297,015

[22] Filed: Jan. 13, 1989

Related U.S. Application Data

[60] Division of Ser. No. 31,205, Mar. 30, 1987, which is a continuation of Ser. No. 736,028, , abandoned.

[30] Foreign Application Priority Data

May 22, 1984 [JP] Japan .................... 59-101712

[51] Int. Cl.$^5$ ............................ B29C 47/24
[52] U.S. Cl. ..................... 264/209.2; 264/211.21; 264/310; 425/206; 425/381; 425/467
[58] Field of Search .... 264/209.1, 209.2, 209.3–209.8, 264/323, 176.1, 211.21, 310; 425/467, 466, 381, 380, 382.3, 113, 114, 205–208, 204, 382.4

[56] References Cited

U.S. PATENT DOCUMENTS

| | | | |
|---|---|---|---|
| 3,276,075 | 10/1966 | Harwood | 425/381 |
| 3,387,331 | 6/1968 | Billings | 264/209.2 |
| 3,400,428 | 9/1968 | Barainsky | 425/382.3 |
| 3,887,319 | 6/1975 | Cottingham | 425/207 |
| 3,890,416 | 6/1975 | Bauer et al. | 264/176.1 |
| 4,021,170 | 5/1977 | Anderson et al. | 425/381 |
| 4,225,547 | 9/1980 | Okita | 264/209.2 |
| 4,494,877 | 1/1985 | Upmeier et al. | 425/208 |
| 4,518,552 | 5/1985 | Matsuo et al. | 264/323 |

FOREIGN PATENT DOCUMENTS

| | | | |
|---|---|---|---|
| 57-36638 | 2/1982 | Japan | 425/207 |
| 58-215321 | 12/1983 | Japan | 425/380 |
| 59-24633 | 2/1984 | Japan | 264/209.7 |
| 61-143112 | 6/1986 | Japan | 264/323 |
| 61-237618 | 10/1986 | Japan | 425/380 |

Primary Examiner—Jeffery Thurlow
Attorney, Agent, or Firm—Armstrong, Nikaido, Marmelstein, Kubovcik & Murray

[57] ABSTRACT

Disclosed is a method and apparatus for producing a flexible tube of a thermoplastic resin having poor melt flowability by melting a thermoplastic resin having poor melt flowability in a screw extruder, and melt-extruding the molten thermoplastic resin from a tube die having an L/D of 30-70 provided at a mandrel rotatable with the rotation of the screw.

3 Claims, 1 Drawing Sheet

FLEXIBLE TUBE OF THERMOPLASTIC RESIN HAVING POOR MELT FLOWABILITY AND PRODUCTION METHOD AND APPARATUS THEREOF

This is a division of application Ser. No. 31,205, filed Mar. 30, 1987, which was a continuation of application Ser. No. 736,028, now abandoned.

BACKGROUND OF THE INVENTION

1. Field of the Invention

The present invention relates to a flexible tube of a thermoplastic resin having poor melt flowability, such as ultra-high-molecular-weight polyethylene and fluoroplastics. The present invention also relates to a method and apparatus for producing a tube from a thermoplastic resin having poor melt flowability.

2. Description of the Related Art

Fluoroplastics and ultra-high-molecular-weight polyethylene are widely used as so-called engineering plastics because of their excellent impact resistance, abrasion resistance, self-lubrication, chemical resistance, and other properties. However, these plastics have extremely high melt viscosity and poor flowability when compared with conventional resins, so that it is very difficult to mold them by conventional extrusion molding and injection molding. Accordingly, fluoroplastics and ultra-high-molecular-weight polyethylene are generally molded by compression molding. However, continuous lengths such as pipes and rods cannot be substantially molded by compression molding. A ram extruder provided with a mandrel has been proposed in, for example, Japanese Unexamined Patent Publication (Kokai) No. 55-28896, as an apparatus for continuously producing pipes of ultra-high-molecular-weight polyethylene. However, as is known in the art, ram extruders have disadvantages in that the molding rate and accuracy in the uniform section are poor. Thus, good pipes cannot be obtained. Furthermore, the molding of flexible tubes having a small outer diameter and a thin wall thickness is impossible. Although the molding rate can be increased by using a screw type extruder, neither good pipes nor flexible tubes can be molded from ultra-high-molecular-weight polyethylene. Thus, since ultra-high-molecular-weight polyethylene has extremely high melt viscosity and poor flowability as mentioned above, adjustment is needed in the uniform section and the resin is not sufficiently fused when a pipe forming die for conventional resins is used. Furthermore, sizing (i.e., regulation of the outer or inner diameter) cannot be effected by a conventional vacuum former or inner pressure controlling, internal stress remains after quenching, and therefore, the physical properties of the molded pipes are unpreferably decreased.

On the other hand, it has been proposed in, for example, Japanese Examined Patent Publication (Kokoku) Nos. 40-6993 and 43-16859 and Japanese Unexamined Patent Publication (Kokai) No. 51-137759, that a mandrel be rotated against a die in the production of thermoplastic resin tubes. However, when this method is applied to ultra-high-molecular-weight polyethylene, the desired flexible tube of ultra-high-molecular-weight polyethylene cannot be obtained since ultra-high-molecular-weight polyethylene has an extremely high melt viscosity and flowability, unlike conventional polyolefins. For when the die head having a flow path such that a molten resin partially flows in a direction opposite to the extrusion direction, as disclosed in Japanese Examined Patent Publication No. 40-6993, is used, extrusion molding is impossible. Furthermore, when an apparatus having a crosshead, as disclosed in Japanese Examined Patent Publication (Kokoku) No. 43-16859, is used, the molten resin separated at the crosshead cannot be fused in the die at all. When an apparatus having a circular orifice provided between the screw tip and the die, as disclosed in Japanese Unexamined Patent Publication No. 51-137759, is used, the back pressure becomes extremely high and, therefore, extrusion moldability is poor and the desired product cannot be obtained. As mentioned above, the desired flexible tube cannot be obtained from a thermoplastic resin having poor melt flowability such as ultra-high-molecular-weight polyethylene and fluoroplastics by extrusion molding.

SUMMARY OF THE INVENTION

Accordingly, the objects of the present invention are to eliminate the above-mentioned disadvantages of the prior art and to provide a flexible tube of a thermoplastic resin having poor melt flowability such as ultra-high-molecular-weight polyethylene.

Another object of the present invention is to provide a method for producing a tube from a thermoplastic resin having poor melt flowability, in a screw type extruder.

A further object of the present invention is to provide an apparatus for producing a tube from a thermoplastic resin having poor melt flowability.

Other objects and advantages of the present invention will be apparent from the following description.

In accordance with the present invention, there is provided a flexible tube of a thermoplastic resin having poor melt flowability, said tube having an intrinsic viscosity of at least 3.5 dl/g, a tensile strength at break of 150 kg/cm$^2$, a breaking time at hot internal pressure creep of at least 200 hours, an outer diameter of 50 mm∅ or less, and a ratio of the outer diameter to the wall thickness of 40 or less.

In accordance with the present invention, there is also provided a method for producing a tube from a thermoplastic resin having poor melt flowability comprising the steps of:

melting the thermoplastic resin having poor melt flowability in a screw extruder, and;

melt extruding the molten thermoplastic resin from a tube die having an L/D of at least 5 provided at a mandrel rotatable with the rotation of the screw.

In accordance with the present invention, there is further provided an apparatus for producing a tube from a thermoplastic resin having poor melt flowability comprising, in order from an extruder side, an extruder provided with a grooved cylinder and a screw having a compression ratio of 1 to 2.5; and a tube die composed of a mandrel connected to the screw tip in such a manner that the mandrel is rotatable with the rotation of the screw and an outer die, the tube die having an L/D of at least 5, a ratio $S_1/S_2$ of a cross-sectional area $S_1$ of the inlet portion of the tube die to a cross-sectional area $S_2$ of the intermediate portion of the tube die of 0.5 to 3.0, and a ratio $S_2/S_3$ of a cross-sectional area $S_2$ of the intermediate portion of the tube die to a cross-sectional area $S_3$ of the resin flow path at the outlet portion of the tube die of 1.0 to 3.0.

BRIEF DESCRIPTION OF THE DRAWINGS

The present invention will be better understood from the description set forth below with reference to the accompanying drawing of FIG. 1, which schematically illustrates a cross-section of a typical embodiment of an apparatus for producing a tube from a thermoplastic resin having poor melt flowability.

DESCRIPTION OF THE PREFERRED EMBODIMENTS

Figure 1:
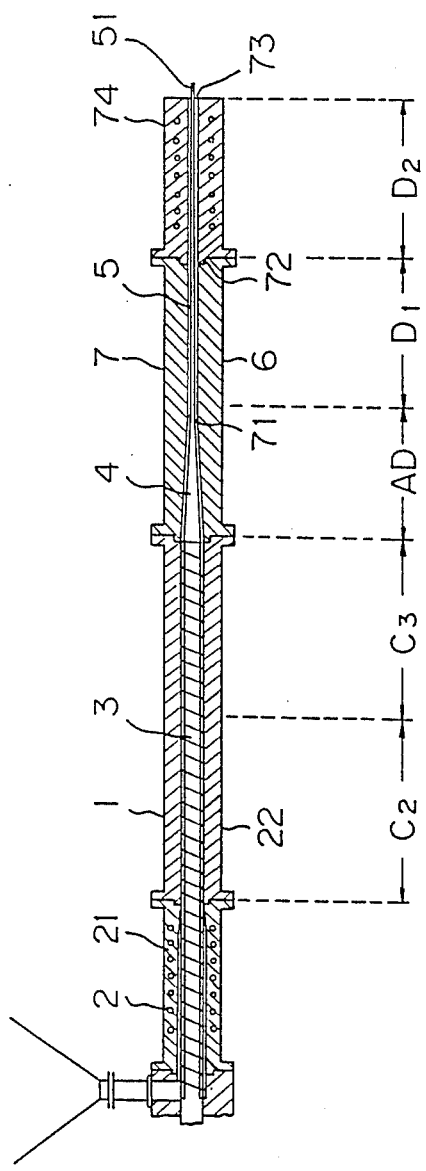

According to the present invention, the desired tube, especially flexible tube, can be produced from a thermoplastic resin having poor melt flowability. The thermoplastic resins having poor melt flowability are those which have extremely high melt viscosities when compared to conventional thermoplastic resins and which are difficult to be molded by conventional extruders. Examples of such thermoplastic resins are ultra-high-molecular-weight polyethylene and fluoroplastics.

The ultra-high-molecular-weight polyethylenes usable in the present invention are crystalline ethylene homopolymer or crystalline ethylene-alpha-olefin copolymers having a major content of ethylene (e.g., an ethylene content of 60 to 99 mol %) having an intrinsic viscosity $[\eta]$, determined at 135° C. in a decalin solvent, of 3.5 dl/g or more, preferably 8 to 25 dl/g, and a melt flow rate (MFR), determined according to an ASTM D-1238(F) method, of 0.01 g/10 min or less. Examples of the alpha-olefin comonomers are those having 3 to 18 carbon atoms such as propylene, 1-butene, 1-hexene, 1-octene, and 4-methyl-1-pentene.

According to the present invention, the flexible tubes of ultra-high-molecular-weight polyethylene prepared from the above-mentioned ultra-high-molecular-weight polyethylene have an intrinsic viscosity $[\eta]$, of 3.5 dl/g or more, preferably 8 to 25 dl/g, determined at 135° C. in decalin, a melt flow rate (MFR) of 0.01 g/10 min or less, determined according to an ASTM D-1238(F) method, a tensile strength (TS) at break of 150 kg/cm$^2$ or more, preferably 200 kg/cm$^2$ or more, and more preferably 250 kg/cm$^2$ or more, determined according to JIS (Japanese Industrial Standards) K 6771, a breaking time at hot internal pressure creep of 200 hours or more, preferably 500 hours or more, and more preferably 1000 hours or more, determined at 80° C. under hoop stress of 40 kg/cm$^2$, an outer diameter of 50 mm∅ or less, preferably 1 to 20 mm∅, and a ratio of the outer diameter to the wall thickness of 40 or less, preferably 2.0 to 20. The tubes according to the present invention have an indefinite length.

When the intrinsic viscosity $[\eta]$ is less than 3.5 dl/g, torsion is caused due to the co-rotation of the resin and the mandrel during the extrusion molding and non-uniformity in wall section is likely to be caused due to the deflection of a mandrel when the L/D is large. Thus, the moldability is poor and the physical properties of the resultant molded articles are degraded (e.g., poor abrasion resistance and large friction coefficient).

The fluoroplastics or fluorocarbon resins are known containing resins such as tetrafluoroethylene resin, tetrafluoroethylene-hexafluoropropylene copolymer resin, and trifluorochloroethylene resin.

However, when the present method is applied to thermoplastic resins having a low melt viscosity such as polypropylene, polyamide, and polyacetal, the moldability is poor as in the above-mentioned case of polyethylene having an intrinsic viscosity $[\eta]$ of less than 3.5 dl/g.

According to the present invention, the tube of a thermoplastic resin can be produced by melting a thermoplastic resin having poor melt flowability in a screw extruder, preferably a screw extruder provided with a grooved cylinder (or barrel), and then melt-extruding the molten thermoplastic resin from a tube die having an L/D of 5 or more, preferably 10 or more, and more preferably, 30 to 70, and having a mandrel rotatable with the rotation of the screw.

When the tube die having an L/D of less than 5 is used, the molten thermoplastic resin having poor melt flowability is not completely uniformly fused before being extruded from the die, since the molten thermoplastic resin is rubber-like mass unlike the molten product of conventional resins and, therefore, only tubes having both poor appearance and poor mechanical strength can be obtained. On the other hand, although there is no upper limit in the L/D of the tube die, the practically preferable upper limit of the L/D is 70 or less. Furthermore, the L/D of the tube die is correlated to the productivity. That is, the production rate is increased with the increase in the L/D.

The mandrel of the tube die used in the present invention must be rotated with the rotation of the screw of the extruder. There is no limitation to the rotation speed of the mandrel, which is not necessarily the same as that of the screw, in the present invention. The object of the present invention may be accomplished if the mandrel only is rotated. The preferable rotation speed of the mandrel is about 5 to 100 rpm, more preferably about 10 to 50 rpm. When the mandrel is not rotated, the mandrel becomes eccentric so that the tube having a uniform thickness cannot be obtained. The mandrel can be attached to the screw tip in any conventional manner. For example, the mandrel may be directly fixed, screwed, fitted, or inserted in to the screw tip or may be attached by means of an appropriate joint. However, it is convenient to directly screw the mandrel to the screw tip, from the standpoint of disassembling and cleaning the tube die and changing the inner diameter size, because in that way the mandrel is easily attached to and removed from the screw tip.

There is no specifical limitation to the extrusion temperature of the thermoplastic resin according to the present invention, as long as the extrusion temperature is substantially higher than the melting point of the thermoplastic resin but is lower than the decomposition temperature thereof. For example, the above-mentioned ultra-high-molecular-weight polyethylene is generally extruded at a temperature of at least the melting point thereof but, preferably, 350° C. or less, when the extrusion temperature is less than the melting point of the thermoplastic resin, the resin is likely to clog the die, possibly causing the destruction of the apparatus. In the case of the above-mentioned ultra-high-molecular-weight polyethylene, the extrusion temperature conditions of the extruder temperature of 200° C. to 330° C., the temperature between the inlet and the intermediate portion of the tube die of 180° C. to 310° C., and the temperatures between the intermediate portion and the outlet of the tube die of 136° C. to 170° C., are preferably used since this prevents unpreferable land melt fractures from occurring in the tube die.

As mentioned above, according to the method of present invention, the tube made of the thermoplastic resin having poor melt flowability can be advantageously obtained. The tubes so produced may be in the form of so-called flexible tubes having excellent flexibility as well as rigid tubes and pipes having a larger diameter.

One example of the apparatus suitable for use in the production of tubes including flexible tubes from thermoplastic resins having poor melt flowability will be explained in detail with reference to the accompanying drawing.

As is illustrated in FIG. 1, the apparatus for producing tubes from thermoplastic resins having poor melt flowability comprises, in order from an extruder side, (i) an extruder 1 provided with a grooved cylinder 2 and a screw 3 having a compression ratio of 1 to 2.5, preferably 1.3 to 1.8; and (ii) a tube die composed of a mandrel 5 connected to the screw tip 4 in such a manner that the mandrel is rotatable with the rotation of the screw and an outer die 6, the tube die having an L/D of at least 5, preferably at least 10, and more preferably, 30 to 60, a ratio $S_1/S_2$ of a cross-sectional area $S_1$ of the inlet portion 71 of the tube die 7 to a cross-sectional area $S_2$ of the intermediate portion 72 of the tube die 7 of 0.5 to 3.0, preferably 1.0 to 2.0, and a ratio $S_2/S_3$ of a cross-sectional area $S_2$ of the intermediate portion of the tube die 7 to a cross-sectional area $S_3$ of the resin flow path at the outlet portion of the tube die 7 of 1.0 to 3.0, preferably 1.1 to 2.0.

The function of the groove portions 21 of the grooved cylinder 2 is to ensure a stable feed of the powder particles of a thermoplastic resin such as ultra-high-molecular-weight polyethylene to the compression zone 22. As mentioned above, the compression ratio of the screw 3 should be within the range of 1 to 2.5. When the compression ratio of the screw 3 is less than 1.0, the contact stress of the resin against the cylinder wall is small, so that the extrusion amount becomes unstable and the resultant extrusion molded articles will have a poor appearance due to surging or insufficient deaeration. Contrary to this, when the compression ratio of the screw 3 is more than 2.5, the resin temperature is abnormally increased due to clogging and the generation of frictional heat in the compression zone, so that the physical properties (e.g., friction coefficient and abrasion resistance) of the extrusion molded articles are impaired due to the decrease in the molecular weight of the resin caused by thermal decomposition.

The mandrel 5 is screwed into the tip of the screw 3.

As mentioned above, the L/D of the tube die should be 5 or more. If the L/D of the tube die is less than 5, good flexible tubes cannot be obtained because the molten resin is not completely fused. The L/D of the tube die is defined by a ratio of the length between the inlet portion 71 of the tube die and the outlet portion 73 of the tube die to the inner diameter of the outer die 6 of the tube die outlet 73. Also, as mentioned above, the ratio $S_1/S_2$ should be within the range of 0.5 to 3.0, when the ratio $S_1/S_2$ is less than 0.5, the space in the die is not sufficiently filled along the configuration of the die by the molten resin, although the die is sufficiently filled in the case of $S_1/S_2$ of less than 1.0 because the intermediate portion of the die is set at a relatively high temperature and also because the back pressure is exerted from the tip of the die. Contrary to this, when the ratio $S_1/S_2$ is more than 3.0, the extrusion of the desired tubes becomes difficult due to the excessive increase in the back pressure. Furthermore, as mentioned above, the ratio $S_2/S_3$ should be within the range of 1.0 to 3.0. When the ratio $S_2/S_3$ is less than 1.0, the molten resin is not completely fused. Contrary to this, when the ratio $S_2/S_3$ is more than 3.0, the desired extrusion molding of tubes becomes difficult due to an excessive increase in the resin pressure.

As mentioned above, the cross-sectional area of the flow path of the tube die becomes basically narrower in the direction of the outlet of the tube die. That is, a so-called tapered die is generally used. However, the tip portion 74 of the tube die is preferably such that the cross-sectional area of the path flow is not changed (i.e., so-called straight) since a high dimensional accuracy can be retained. The L/D of the straight portion is preferably within the range of from 5 to 10.

In addition, the tip 51 of the mandrel 5 is preferably elongated externally from the outer die 6 because possible jetting of the extruded molten resin is ably corrected.

As mentioned above, the flexible tubes of the ultra-high-molecular-weight polyethylene according to the present invention have excellent flexibility, a small friction coefficient, good pressure resistant strength, good appearance, internal face self-lubricating properties, no hygroscopicity, and excellent food sanitation properties, without impairing the inherent abrasion resistance, impact strength, and stress-breaking resistance. Accordingly, the tubes according to the present invention are suitable for use as transportation pipes of foods and chemicals, cable conduits, utility pipes or various parts of apparatuses by utilizing the above-mentioned characteristics.

Furthermore, according to the tube extruding method and apparatus according to the present invention, the desired tubes having a substantially uniform wall thickness can be stably produced from the above-mentioned thermoplastic resins having poor melt flowability including ultra-high-molecular-weight polyethylene.

EXAMPLES

The present invention will now be further illustrated by, but is by no means limited to, the following Examples.

Example 1 and 2 and Comparative Example 1

Flexible tubes of ultra-high-molecular-weight polyethylene were produced by using an apparatus for producing a flexible tube as illustrated in FIG. 1. The specifications of the apparatus used are as follows.

| Screw: | Outer diameter = 20 mmø |
| --- | --- |
| | Effective screw length (L/D) = 22 |
| | Flight pitch = 12 mm (constant) |
| | Compression ratio = 1.8 |
| | Adapter length = 90 mm |
| Tube die: | Length = 240 mm |
| | L/D = 40 |
| | Inner diameter of outer die at die outlet = 6 mmø |
| | Outer diameter of mandrel at die outlet = 5 mmø |
| | $S_1/S_2 = 1.52$ |
| | $S_2/S_3 = 1.17$ |

The particulars of the polyethylene resins used in Examples 1 and 2 and comparative Example 1 are as follows:

Hizex® Million 240 M (Example 1):

Powdered ultra-high-molecular-weight polyethylene resin available from Mitsui Petrochemical Industries, Ltd. having an intrinsic viscosity η of 17 dl/g, an MFR of less than 0.01 g/10 min, a melting point of 136° C. and a bulk density of 0.45 g/cm³

Hizex® Million 220 M (Example 2):

Powdered ultra-high-molecular-weight polyethylene resin available from Mitsui Petrochemical Industries, Ltd. having an intrinsic viscosity [η] of 17 dl/g, an MFR of less than 0.01 g/10 min, a melting point of 115° C., and a bulk density of 0.45 g/cm²

Conventional polyethylene (Comparative Example 1):

Polyethylene having an intrinsic viscosity of 2.6 dl/g, an MFR of 0.11 g/10 min, a density of 0.956 g/cc, and a melting point of 131° C.

The above-mentioned resins were extruded from the above-specified extruder under the following conditions:

| Setting temperature | |
|---|---|
| Extruder = | 270° C. |
| Adapter (AD) = | 250° C. |
| Die base (D$_1$) = | 180° C. |
| Die tip (D$_2$) = | 145° C. |

Screw revolution speed = 25 rpm

The extruded tubes were hauled off at a rate of 1 m/min by haul-off equipment. Thus, flexible tubes having an outer diameter of 5 mm∅, an inner diameter of 4 mm∅, and a ratio of the outer diameter/the wall thickness of 10 were obtained.

The physical properties of the resultant flexible tubes were determined according to the following methods. The results were as shown in Table 1.

Density: ASTM D1505

Outer diameter and wall thickness of product: measured by Nikon MEASURESCOPE MODEL II, Nikon LINEAR PULSE SCALE, and Nikon VM-8A. The data were an average of 5 measurements (n=5) and the standard deviations were calculated (i.e., Average value/Standard deviation in Table 1)

Tensile test: Tensile strength at break (TS: kg/cm²) was determined at a temperature of 23° C. according to JIS (Japanese Industrial Standards) K 6771 (soft vinyl tube)

Hydraulic destructive creep: Breaking pressure (kg/cm³) was determined by hydraulic pressure according to JIS K 6771

Hot internal pressure creep: The tube breaking time was determined at a temperature of 80° C. according to JIS K 6762 under continuous inner pressure calculated from the following equation at a hoop stress of 40 kg/cm².

$$P = \frac{2tf}{d}$$

wherein
P: Pressure (kg/cm²)
d: Outer diameter of tube (cm)
t: Wall thickness of tube (cm)
f: Hoop stress (kg/cm²) = 40 kg/cm²

Examples 3 and 4

Flexible tubes of the ultra-high-molecular-weight polyethylene were produced in the same manner as in Examples 1 and 2, except that the particulars of the apparatus were changed as follows:

Outer diameter of mandrel = 4 mm∅
Extruding temperature (C$_2$) = 300° C.
Extruding temperature (C$_3$) = 300° C.
Haul-off rate = 2.3 m/min Thus, flexible tubes having an outer diameter of mm∅, an inner diameter of 2 mm∅, and a ratio of the outer diameter/the wall thickness of 6 were produced.

The physical properties of the resultant tubes were as shown in Table 1.

TABLE 1

| Test Item | Unit | Example 1 | Example 2 | Comparative Example 1 | Example 3 | Example 4 |
|---|---|---|---|---|---|---|
| | | Outer diameter/Inner diameter = 5/9 mm∅ tube | | | Outer diameter Inner diameter = 3/2 mm∅ tube | |
| | | Million 240 M | Million 220 M | Conventional Polyethylene | Million 240 M | Million 220 M |
| Intrinsic viscosity [η] | dl/g | 15.5 | 16.0 | 2.5 | 12.4 | 12.0 |
| Density | g/cm³ | 0.934 | 0.920 | 0.956 | 0.932 | 0.921 |
| Outer diameter/σ (n = 5) of product | mm | 5.036/0.026 | 5.090/0.018 | 5.110/0.042 | 3.010/0.020 | 3.007/0.021 |
| Wall thickness/σ (n = 5) of product | mm | 0.514/0.019 | 0.507/0.014 | 0.492/0.057 | 0.504/0.010 | 0.515/0.012 |
| Tensile strength at break (TS) | kg/m² | 330 | 260 | 210 | 570 | 410 |
| Hydraulic destructive test | kg/cm² | 51 | 39 | 43 | >100 | 78 |
| Hot internal pressure creep (80° C., f = 40 kg/cm²) | Breaking time (Hrs) | 1000 | 1000 | 94 | >1000 | >1000 |

We claim:

1. A method for producing a tube from a thermoplastic resin having poor melt flowability comprising the steps of:
   melting the thermoplastic resin having poor melt flowability in a screw extruder, and;
   melt extruding the molten thermoplastic resin from a tube die having an L/D of 30–70 provided at a mandrel rotatable with the rotation of the screw.

2. A method as claimed in claim 1, wherein the screw extruder is provided with a grooved cylinder.

3. An apparatus for producing a tube from a thermoplastic resin having poor melt flowability comprising, in order from an extruder side,
   an extruder provided with a grooved cylinder and a screw having a compression ratio of 1 to 2.5; and
   a tube die composed of a mandrel connected to a tip of the screw in such a manner that the mandrel is rotatable with the rotation of the screw and an outer die, the tube die having an L/D of 30–70, a ratio S$_1$/S$_2$ of a cross-sectional area S$_1$ of the inlet portion of the tube die to cross-sectional area S$_2$ of the intermediate portion of the tube die of 0.5 to 3.0, and a ratio S$_2$/S$_3$ of a cross-sectional area S$_2$ of the intermediate portion of the tube die to a cross-sectional area S$_3$ of the resin flow path at the outlet portion of the tube die of 1.0 to 3.0.

* * * * *